United States Patent [19]

Missout

[11] Patent Number: 5,464,308
[45] Date of Patent: Nov. 7, 1995

[54] PROCESS AND APPARATUS FOR SIMULTANEOUSLY LAYING LONG PRODUCT AND PROTECTIVE TUBE IN THE GROUND

[75] Inventor: Bernard Missout, Ivry sur Seine, France

[73] Assignee: Cables Pirelli S.A., France

[21] Appl. No.: 224,168

[22] Filed: Apr. 7, 1994

[30] Foreign Application Priority Data

Apr. 8, 1993 [FR] France ................................. 93 04183

[51] Int. Cl.⁶ .......................................... F16L 1/028
[52] U.S. Cl. ........................ 405/183; 405/174; 405/184
[58] Field of Search ................................. 405/174, 180, 405/183, 184; 104/281, 282, 283; 198/619; 254/134.3 R, 134.3 FT, 134.3 SE

[56] References Cited

U.S. PATENT DOCUMENTS 3,390,533  7/1968  Gremillion ........................... 61/72.6
4,488,477  12/1984  Miyamoto ......................... 198/619 X
4,896,997  1/1990  Gaylin ............................... 405/174 X

FOREIGN PATENT DOCUMENTS 28487    12/1956  Finland ................................ 198/619
3521566  12/1986  Germany ........................ H02G 1/06
A81062   3/1979  Luxembourg .

Primary Examiner—David H. Corbin
Attorney, Agent, or Firm—Brooks Haidt Haffner & Delahunty

[57] ABSTRACT

The invention relates to a process and apparatus for laying a product of great length (40) in the ground. As a furrow is formed by breaking up the ground a tube is laid in the furrow and, at the same time, the product is pulled inside the tube, at one end by means of a magnetic pulling device including a yoke and a core received in the tube and the yoke. The yoke and core produce a radial magnetic field between them capable of axially immobilizing the core in relation to the yoke. The tube is in the air gap between the yoke and the core and the product is fixed to the core. The pulling force applied to the product is produced by displacing the yoke as the tube is laid.

4 Claims, 1 Drawing Sheet

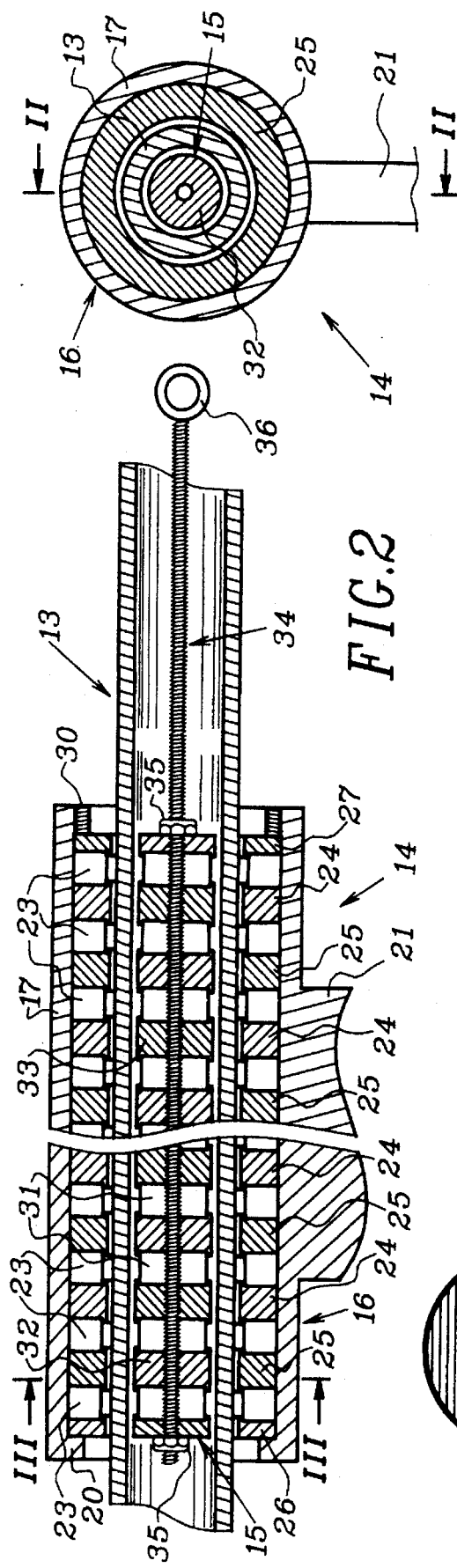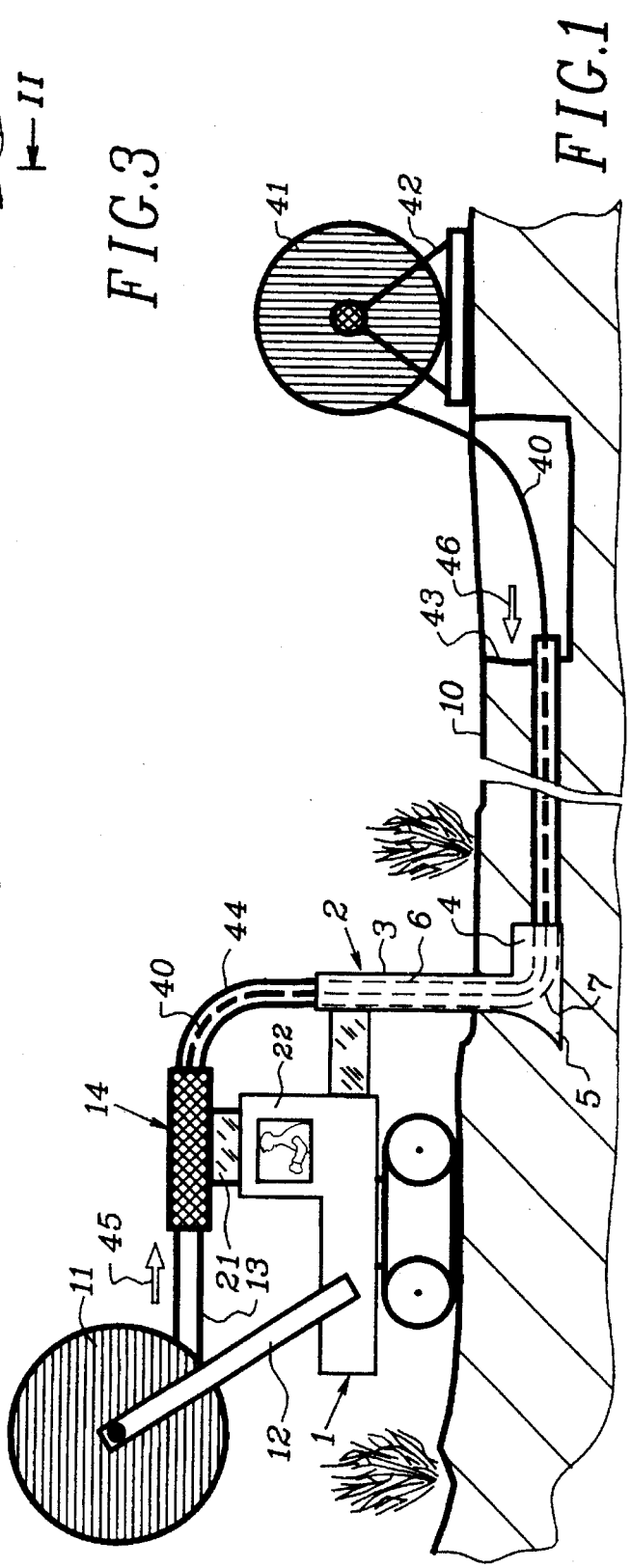
FIG.1
FIG.2
FIG.3

PROCESS AND APPARATUS FOR SIMULTANEOUSLY LAYING LONG PRODUCT AND PROTECTIVE TUBE IN THE GROUND

The invention relates to a process for laying in the ground a product of great length, such as a cable or a tubular product, the preferred applications being, in the first place, the burial of telecommunication cables and, in the second place, the burial of electric power cables.

The object of the invention is to provide a process for laying the said product, according to which there is further placed in the ground a protective tube designed to surround the product, the special problems to be solved being, on one hand, to lay the tube and the product swiftly along the entire route of the product and, on the other hand, to make it easy to cross those "singular points" formed, for example, by roads, pipelines, rivers, etc.

For this purpose, the process according to the invention consists in breaking up the ground to form a furrow, placing in the said furrow, in proportion as it is produced, a length of a tube suitable for housing the said product with a certain amount of play and, while proceeding to lay the said tube, pulling the product by one end inside the said tube by means of a magnetic pulling device including a tubular yoke, through which the tube can pass with a certain amount of play, and a cylindrical core capable of being housed with a certain amount of play in the tube, the yoke and the core comprising magnetic means arranged to produce a radial magnetic field between them and through the said tube, capable of axially immobilising the core in relation to the yoke, the said end of the product being fixed to the said core, the traction exerted on the product being produced by moving the said yoke along the furrow in proportion as the latter is produced.

The first aforementioned problem is solved thanks to the fact that the tube and the product are laid simultaneously in the same operation, rather than by means of two successive operations whereby first the tube is put into place and then the product is drawn into the tube over a great length by means of a wire.

The second aforementioned problem is solved thanks to the fact that, when a singular point is encountered, it suffices to cut the tube, to pass a length of tube and of product underneath the singular point, and then to join together the two parts of tube thus formed, as will be explained in detail hereinafter.

The invention also relates to a device for laying a product of great length in the ground, enabling the aforementioned process to be implemented, as well as to a magnetic pulling device for pulling such a product through a tube.

Further details and advantages of the invention will emerge in the course of the following description of a preferred, but non-limitative embodiment, with reference to the annexed pullings, wherein:

FIG. 1 is an elevation view of a device for laying a cable in the ground for implementing the process according to the invention;

FIG. 2 is a longitudinal cross-sectional view of the magnetic pulling device used in FIG. 1, along line II—II of FIG. 3; and FIG. 3 is a cross-sectional view of the magnetic pulling device along line III—III of FIG. 2.

FIG. 1 shows a subsoil plough 1 constituted by a tracked tractor, to the rear of which is attached a vibrating ploughshare 2. The vibrating ploughshare is generally L-shaped and includes an upright member 3 and a transverse base 4, one end of the base adjacent to the upright member bearing a ploughshare forming point 5. Longitudinally through upright member 3 and base 4 passes a cylindrical cavity 6 of circular cross-section extending, in an area of junction between upright member 3 and base 4, so as to form an elbow 7. The arrangement is such that the base 4 of ploughshare 2 is placed benath the surface 10 of the ground.

In a forward region, subsoil plough 1 carries a tube reel 11 rotationally supported on two arms 12 and on which is wound a tube 13. The tube reel 11 comprises means, not represented, for braking its rotation. Tube 13 is made of a semi-rigid non-magnetic material that is sufficiently flexible to allow it to be wound around tube reel 11, for example high density polyethylene. Advantageously, tube 13 is internally provided with a lubricating layer such as a layer of silicone or a film of oil.

Subsoil plough 1 further carries, in a region intermediate between tube reel 11 and ploughshare 2, a magnetic pulling device 14 including a central core 15 and a peripheral yoke 16 housing the said core. Yoke 16 includes a cylinder 17 of circular cross-section having an internal rim 20 at one end and bearing a foot 21 in the form of a rectangular plate extending over one portion of the length of cylinder 17 and connecting an external surface thereof to subsoil plough 1. Cylinder 17 is fixed to as to extend parallel to the direction of travel of subsoil plough 1 and to face a portion of tube 13 as delivered by tube reel 11.

Inside cylinder 17 are housed a number of pole pieces 24, 25, magnetized by permanent magnets 23 to form a succession of north poles 24 and south poles 25. These magnets and poles take the form of circular crowns the outside diameter of which corresponds substantially to the inside diameter of cylinder 17. The north poles 24 and south poles 25 are placed alternately along cylinder 17 and separated from one another by magnets 23 in such a way that each magnet 23 is intercalated between a north pole 24 and a south pole 25, each pole being double in that it constitutes a pole piece of the same sign for the two magnets between which it is located. At the two ends of cylinder 17 are located respectively a single north pole 26 and a single south pole 27, the thickness of which is half that of the double poles 24, 25. To the end of cylinder 17 remote from rim 20 is screwed an annular nut 30 which cooperates with the internal surface of the cylinder so as to press against one another magnets 23 and poles 24 to 27.

Core 15 of magnetic pulling device 14 is formed by a stack of magnets 31, of north poles 32 and of south poles 33 taking the form of discs the thickness of which is identical with that of the crowns equipping the yoke 16, arranged alternately along the core in the same way as the crowns, the number of discs being equal to that of the crowns. However, the arrangement of discs 31 to 33 is offset in relation to that of the crowns in such a way that, when core 15 and yoke 16 occupy the same axial position, their respective magnets 31, 23 are placed opposite one another, while the north poles 32 of the one face the south poles 25 of the other, and vice versa: this mutual positioning of yoke 16 and core 15 corresponds to a position of the magnetic pulling device wherein there is a purely radial magnetic field extending between the poles of yoke 16 and those of core 15, the core not, therefore, being subjected to any axial traction. On the other hand, when the core is subjected to the greatest force of axial traction permissible, it is offset towards the right of FIG. 2 by a distance that is in the order of magnitude of the thickness of magnets 23, 31, the radial magnetic field then being deformed.

Discs 32 and 33 are centrally traversed by a threaded rod 34 and pressed against one another thereupon by means of two nuts 35 located on either side of the set of discs. On one side of core 15 facing towards the rear of the subsoil plough 1, threaded rod 34 extends beyond it over a certain length and bears, on its end, a ring 36.

Tube 13 passes through yoke 16, surrounding core 15. The respective diameters of these parts are such that there remains only a slight amount of radial play between tube 13 and yoke 16, on one hand, and between the said tube and the core, on the other hand, selected so as to permit relative movement of these parts in relation to one another.

The material forming the magnets and the number of the latter are chosen in such a way that core 15 can withstand an axial tensile force in the order of 200 to 300 daN. In this example, use was made of "NFB" magnets chiefly composed of neodymium, iron and boron. A number of pairs of north and south poles equal to twenty or so, corresponding to a magnetic pulling device length of approximately 1 m, permitted a resistance to axial tensile stress corresponding to 260 daN. Poles 24, 25, 32, 33 of yoke 16 and core 15 are made of a soft ferromagnetic material. As to cylinder 17 of yoke 16, this is made of a non-magnetic material.

There will now be described the laying of a cable 40 such as a telecommunications cable or an electric power cable, wound around a cable reel 41 comprising support means 42 enabling it to be placed upon the ground 10. The cable is, for example, one with a diameter of 14 mm, with which is associated a tube with an outside diameter of 50 mm. First of all, a pit 43 of small dimensions is dug out, to a depth corresponding to that at which the cable 40 is to be buried, and in which is placed vibrating ploughshare 2 of subsoil plough 1. The free end of cable 40 is passed through cavity 7 of vibrating ploughsare 2, starting from base 4 thereof, until it comes out at the free end of upright member 3, and it is fastened to ring 36 of the magnetic pulling device. The free end of tube 13 is then placed between yoke 16 and core 15 of the magnetic pulling device. This operation can be carried out, in practice, in various ways. For example, retractable centering fingers can be provided inside the yoke to hold the core so that it is coaxial therewith, prior to insertion of the tube. Alternatively, the yoke can be designed in the form of two semi-cylindrical half-shells that will be fitted around the tube and assembled to one another, after the core has been inserted into the tube.

The free end of tube 13 is then inserted inside vibrating ploughshare 2, starting from the free end of upright member 3 thereof, causing a curve 44 in the tube between the magnetic pulling device and the vibrating ploughshare. Once the free end of tube 13 has emerged slightly from base 4 of vibrating ploughshare 2, the cable burying operation can commence.

As subsoil plough 1 moves forward such that the tip 5 of the vibrating ploughshare breaks up the ground, and owing to the fact that the part of tube 13 already buried is immobilized in the ground, traction is applied to the tube 13, displacing it towards magnetic pulling device 14 in the direction of arrow 45,1and then towards vibrating ploughshare 2, to rest finally horizontally in the subsoil. At the same time, as it moves forward, subsoil plough 1 exerts traction on cable 40 in the direction of arrow 46, whicb has the effect, for each unit length of buried tube 13, of placing a corresponding length of cable inside the said tube.

When crossing a singular point, such as a road, a pipeline or a river, not allowing subsoil plough 2 to continue to move forward, the plough is halted and its ploughshare 2 is raised. Two pits having been excavated in advance, one on either side of the singular point, subsoil plough 1 is driven over the said point so as to supply an additional length of tube 13 and cable 40 corresponding to a width by which the said singular point extends. Tube 13 is then cut, for example just downstream of magnetic pulling device 14, and cable 40 is detached from ring 36.

A passage conduit suitable to receive tube 13 having further been previously placed beneath the singular point, the said additional length of tube and of cable is slid into the said conduit. The cable is then re-fastened to ring 36 of magnetic pulling device 14, and tube 13 supplied by tube reel 11 is pulled on to obtain a length of tube that is inserted into ploughshare 2 and which is connected to the said additional length of tube placed in the passage conduit, by means of a suitable connecting sleevee: subsoil plough 1 is then ready to drive off again.

It will be noted that, advantageously, the invention does not require the entire length of tube and cable placed on tube reel 11 and cable reel 41, respectively, to be unwound upon crossing the singular point, which makes for a considerable saving in operating time.

As an alternative to the magnetic pulling device 14 described above, each crown 23 to 27 or disc 31 to 33 can be replaced by a group of discrete elements, juxtaposed and disposed peripherally about the axis of magnetic pulling device 14.

According to an alternative form of embodiment, the magnetic pulling device can be of the electro-magnetic type, that is to say designed according to the principal of an electromagnet, and comprise windings of conductive wires, either connected to an electric power source, in the case of windings borne by the yoke, or not connected to such a source, in the case of windings borne by the core. If need be, the magnetic pulling device can comprise both windings of conductive wires supplied with electricity and permanent magnets.

Of course, tube 13 can be of any cross-section of a suitable shape, other than the aforementioned circular cross section.

Furthermore, although, in this example, the means for guiding tube 13 into the ground are integral with the means for breaking up the ground, and take the form of hollowed out vibrating ploughshare 2, such means can be physically separate from one another: thus, the means for breaking up the ground can consist of a rock saw placed ahead of the tube guiding means, with the latter being of the same general L shape as vibrating ploughshare 2.

I claim:

1. Process for laying in the ground a product of great length simultaneously with the laying of a protective tube designed to surround the said product, characterized in that it includes the steps of:

while advancing furrow forming apparatus in a predetermined direction and breaking up the ground to form a furrow, laying in the said furrow as the furrow is produced, a length of a non-magnetic tube (13) suitable for housing the said product (40) with a certain amount of play so that the product can move with respect to the tube, the length of said tube laid in said furrow increasing as the length of said furrow increases; and while proceeding to form said furrow and to lay the said tube (13), supplying said product to the end of said tube remote from said furrow forming apparatus and pulling the product by one end inside the said tube by means of a magnetic pulling device (14) including a tubular yoke (16) through which the tube (13) can pass with a certain amount of play and movable in said predetermined direction as said furrow forming apparatus advances in said predetermined direction and said tube (13) is laid, and a cylindrical core (15) capable of being housed with a certain amount of play in the tube, the yoke and the core comprising magnetic means (23 to 27; 31 to 33) arranged to produce a radial magnetic field between said yoke and said core and through the said tube (13), said magnetic field being capable of pulling the core (15) axially of said tube (13) when said yoke (16) is moved in said direction, the said end of the product being fixed to the said core so that the product is pulled axially of said tube (13) as said tube (13) is laid in the furrow and is at least co-extensive with the length of tube (13) laid in the furrow.

2. Device for laying in the ground a product of great length (40) placed in a non-magnetic tube (13), characterized in that it includes a tractor (1) on which are mounted:

breaking means (5) arranged to break up the ground to form a furrow to a depth corresponding to the depth at which the product is laid;

a tube reel (11) suitable for supplying a length of tube equal to that of the product to be laid in said furrow; and a magnetic pulling device for pulling the product (40) inside the tube (13), placed between the tube reel (11) and the breaking means (5) and including a tubular yoke (16) through which the tube (13) can pass with a certain amount of play, and a cylindrical core (15) suitable for being housed with a certain amount of play in the tube, the yoke and the core comprising magnetic means (23 to 27; 31 to 33) arranged to produce a radial magnetic field between them and through the said tube, said magnetic field being capable of pulling the core (15) when said yoke (16) is moved with said tractor, the yoke being fixed to the tractor and the core including means for fixing one end of the product said core; and guiding means (3, 4) placed in the vicinity of the breaking means (5), but downstream thereof in relation to the direction of travel of the tractor, arranged to extend into the ground as far as the depth of said furrow and to guide the tube (13) into the ground as far as the depth of said furrow in order to deposit it therein.

3. Laying device according to claim 2, wherein the tractor carries a hollow cylinder (3, 4) arranged to be traversed with a certain amount of play by the said tube (13) and forming the said guiding means, the said cylinder bearing, on an external surface, a ploughshare-forming extension (5) and constituting the said breaking means.

4. Laying device according to claim 2 or claim 3, wherein the product (40) is wound around a product reel (41) equipped with support means (42) whereby the said product reel rests on the ground upstream the tube in said furrow.

* * * * *